(12) United States Patent
Jeong et al.

(10) Patent No.: US 9,713,790 B2
(45) Date of Patent: Jul. 25, 2017

(54) COMPOUND INCLUDING OXALATE, CARBON DIOXIDE ABSORBENT INCLUDING THE SAME, METHOD OF PREPARING CARBON DIOXIDE ABSORBENT AND METHOD OF REMOVING CARBON DIOXIDE

(71) Applicant: KOREA INSTITUTE OF ENERGY RESEARCH, Daejeon (KR)

(72) Inventors: Soon Kwan Jeong, Daejeon (KR); Yeo Il Yoon, Daejeon (KR); Sung Chan Nam, Daejeon (KR); Soo Hyun Choi, Daejeon (KR); Sung Ho Yoon, Seol (KR); Nam Seok Kim, Seoul (KR); Bon Sik Joo, Gyeonggi-do (KR)

(73) Assignee: Korea Institute of Energy Research, Daejeon (KR)

( * ) Notice: Subject to any disclaimer, the term of this patent is extended or adjusted under 35 U.S.C. 154(b) by 577 days.

(21) Appl. No.: 14/140,063

(22) Filed: Dec. 24, 2013

(65) Prior Publication Data

US 2015/0056114 A1    Feb. 26, 2015

(30) Foreign Application Priority Data

Aug. 21, 2013    (KR) ......................... 10-2013-0098975

(51) Int. Cl.
*B01D 53/14*    (2006.01)
*B01D 53/62*    (2006.01)

(52) U.S. Cl.
CPC ......... *B01D 53/62* (2013.01); *B01D 53/1475* (2013.01); *B01D 53/1493* (2013.01); *B01D 2252/2053* (2013.01); *B01D 2258/0283* (2013.01); *Y02C 10/04* (2013.01); *Y02C 10/06* (2013.01)

(58) Field of Classification Search
None
See application file for complete search history.

(56) References Cited

U.S. PATENT DOCUMENTS

2011/0155432 A1*  6/2011  Tomonari .............. B22F 1/0022
                                                          174/257
2012/0171094 A1*  7/2012  Chinn ................ B01D 53/1475
                                                          423/228

FOREIGN PATENT DOCUMENTS

CN    WO 2011011830 A1 *  2/2011  ......... C01D 53/1425

OTHER PUBLICATIONS

Prabhumirashi et al., "TGA and DTA studies on en and tmn complexes of Cu(II) chloride, nitrate, sulphate, acetate and oxalate", Thermochimica Acta 383 (2002) 109-118.*

(Continued)

*Primary Examiner* — Anita Nassiri Motlagh
(74) *Attorney, Agent, or Firm* — Evan Law Group LLC

(57) ABSTRACT

Disclosed are a compound including an oxalate, a carbon dioxide absorbent including the same, a method of preparing the carbon dioxide absorbent and a method of removing carbon dioxide, which may overcome issues of high recycling energy and low absorptivity of a conventional carbon dioxide absorbent to considerably reduce recycling energy and absorb a greater amount of carbon dioxide per unit absorbent, so that a size of a carbon dioxide absorption tower may be reduced and a less amount of recycling energy may be used, contributing to a substantial decrease in device manufacture costs and management costs.

11 Claims, 5 Drawing Sheets

(56) References Cited

OTHER PUBLICATIONS

Keene et al., "One-Dimensional Magnetism in New, Layered Structures: Piperazine-Linked Copper and Nickel Oxalate Chains", Eur. J. Inorg. Chem. 2004, 1007-1013.*
Bajpai et al., "Studies on Amoebicidal and Bactericidal Activity of Iron, Cobalt and Copper Complexes with Various Amines", Agric. Biol. Chem., 46(3), 623-626, 1982.*
Vaudo, A.F. et al., "Intermediates in the photochemistry of amine-oxalate complexes of cobalt(III) in aqueous solution", Journal of the American Chemical Society, vol. 94, issue 19, pp. 6655-6665, (1972).

* cited by examiner

COMPOUND INCLUDING OXALATE, CARBON DIOXIDE ABSORBENT INCLUDING THE SAME, METHOD OF PREPARING CARBON DIOXIDE ABSORBENT AND METHOD OF REMOVING CARBON DIOXIDE

CROSS-REFERENCE TO RELATED APPLICATION

This application claims the priority benefit of Korean Patent Application No. 10-2013-0098975, filed on Aug. 21, 2013, in the Korean Intellectual Property Office, the disclosure of which is incorporated herein by reference.

BACKGROUND

1. Field of the Invention

The present invention relates to a compound including an oxalate, a carbon dioxide absorbent including the same, a method of preparing the carbon dioxide absorbent and a method of removing carbon dioxide.

2. Description of the Related Art

Since the industrial age, energy is produced mostly using fossil fuels including coal and petroleum. However, carbon dioxide resulting from use of fossil fuels is considered mainly responsible for many environmental problems such as greenhouse effects. Thus, efforts to reduce amounts of carbon dioxide discharged to the air are continuously made all over the world so as to resolve environmental issues. One approach to overcome such environmental problems is selectively capturing and separating only carbon dioxide from exhaust gases discharged from emission sources that emit substantial amounts of carbon dioxide, such as power plants, cement factories and steel plants, and stably storing the separated carbon dioxide. This technique is commonly referred to as carbon dioxide capture and storage (CCS), and a great number of counties now make substantial investment in development of CCS technologies. CCS is divided into post-combustion capture, pre-combustion capture, and oxy-fuel combustion, wherein post-combustion capture is a scheme which is immediately applicable by adding an absorption tower to a conventional emission source and thus expected to be commercially available in the nearest future. A carbon dioxide absorbent used in post-combustion capture includes alkanolamines, ammonia and ionic liquids, among which alkanolamines are widely used. Generally used amines include primary amines including monoethnaol amine (MEA) and diglycolamine (DGA), secondary amines including diethanolamine (DEA) and di-isopropylamine (DIPA), and tertiary amines including triethanolamine (TEA) and methyl-diethnaolamine (MDEA). However, these amine absorbents may need resupplying due to deterioration and evaporation issues during a recycling process after absorbing carbon dioxide. Also, when the concentration of an alkanolamine absorbent is adjusted to a high level so as to increase absorbed amount of carbon dioxide, a device is corroded and too much energy is involved in recycling the absorbent. Particularly, costs for absorbing and recycling carbon dioxide account for 70% of total CCS costs, about 70% of which is due to recycling energy, that is, about 50% of the total CCS costs account for energy for recycling the absorbent. Thus, extensive researches and developments are being conducted to reduce recycling energy of an absorbent that absorbs carbon dioxide.

There are a large number of enzymes using carbon dioxide in nature. Ribulose-1,5-bisphosphate carboxylase oxygenase (RuBisCO) is an enzyme that is the most abundant in all living things. RuBisCO is an enzyme functioning in the Calvin cycle, which is involved in fixation of carbon dioxide and generates energy using fixed carbon dioxide. FIG. 1 illustrates an activated site of RuBisCO. RuBisCO includes eight large protein pieces and eight small protein pieces, in which fixation of carbon dioxide occurs actually in an active site of the large protein pieces. In detail, the active site has a structure in which a magnesium ion ($Mg^{2+}$) as a metal at the center is surrounded by two carboxylic acid functional groups from amino acids, and ribulose-1,5-bisphosphate, and weakly interacts with amine of lysine.

Fixation of carbon dioxide molecule in the active site of RuBisCO is carried out through two stages. In a first stage, an amine group of lysine is coupled with carbon dioxide to form carbamate, which is then coupled with a magnesium ion ($Mg^{2+}$) to stabilize coupling. FIG. 2 illustrates coupling of a magnesium ion ($Mg^{2+}$), lysine and carbon dioxide in the active site of RuBisCO. In this stage, the coupling is realized only with partial pressure of a gas without addition of energy. If partial pressure of oxygen is higher than that of carbon dioxide, oxygen occupies the active site of RuBisCO, in which case RuBisCo loses activity. On the contrary, if the partial pressure of carbon dioxide is higher than that of oxygen, carbon dioxide is coupled with lysine of RuBisCO, and accordingly RuBisCO has activity.

SUMMARY

An aspect of the present invention is to provide a compound that is capable of absorbing a greater amount of carbon dioxide per unit absorbent and reducing recycling energy to achieve cost effectiveness, a carbon dioxide absorbent, a method of preparing the carbon dioxide absorbent and a method of removing carbon dioxide.

However, technical problems to be solved by the present invention are not limited to the aforementioned problems, and issues not mentioned herein will be clearly understood by a person skilled in the art from the following description.

According to an aspect of the present invention, there is provided a compound including a divalent metal ion, an oxalate and an amine ligand.

The compound is represented by Formula 1 or Formula 2:

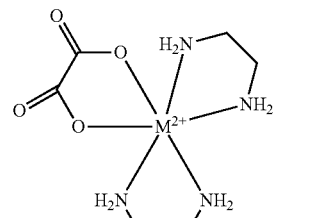

[Formula 1]

and

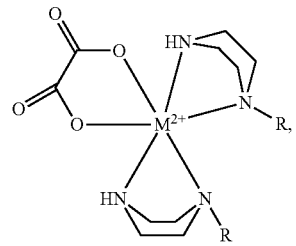

[Formula 2]

where $M^{2+}$ is the divalent metal ion and R is independently H or $CH_3$.

The divalent metal ion may include at least one selected from the group consisting of magnesium, calcium, nickel, zinc, strontium, barium, iron, copper, cobalt, lead and manganese, without being limited thereto.

The amine ligand may include at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, triethylenetetramine, N,N'-Bis(3-aminopropyl)ethylenediamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol 3-aminopropanol, 2-ethylaminoethanol, 2-methylaminoethanol and 2-diethylaminoethanol, without being limited thereto.

The divalent metal ion may be present, in the compound, in an amount of 10% by weight (wt %) to 50 wt %.

The oxalate may be present, in the compound, in an amount of 45 wt % to 70 wt %.

The amine ligand may be present, in the compound, in an amount of 35 wt % to 60 wt %, without being limited thereto.

According to another aspect of the present invention, there is provided a carbon dioxide absorbent including the compound and an organic solvent.

The organic solvent may include at least one selected from the group consisting of ethylene glycol, propylene glycol, butylene glycol, hexylene glycol, diethylene glycol, dipropylene glycol and triethylene glycol, without being limited thereto.

According to still another aspect of the present invention, there is provided a method of preparing a carbon dioxide absorbent, the method including preparing a compound including a divalent metal ion, an oxalate and an amine ligand, and mixing the compound and an organic solvent.

The divalent metal ion may include at least one selected from the group consisting of magnesium, calcium, nickel, zinc, strontium, barium, iron, copper, cobalt, lead and manganese, and the amine ligand may include at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, triethylenetetramine, N,N'-Bis(3-aminopropyl)ethylenediamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol 3-aminopropanol, 2-ethylaminoethanol, 2-methylaminoethanol and 2-diethylaminoethanol, without being limited thereto.

According to yet another aspect of the present invention, there is provided a method of removing carbon dioxide, the method including bringing a gas including carbon dioxide into contact with a carbon dioxide absorbent including a compound including a divalent metal ion, an oxalate and an amine ligand and an organic solvent, absorbing carbon dioxide from the gas, and recycling the carbon dioxide absorbent.

The absorbing of the carbon dioxide may be carried out at a pressure in a range of atmospheric pressure to 10 atmospheres (atm), and at a temperature in a range of room temperature to 70° C.

The recycling of the carbon dioxide absorbent may be carried out at a pressure in a range of atmospheric pressure to 5 atm and at a temperature in a range of 80° C. to 150° C.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
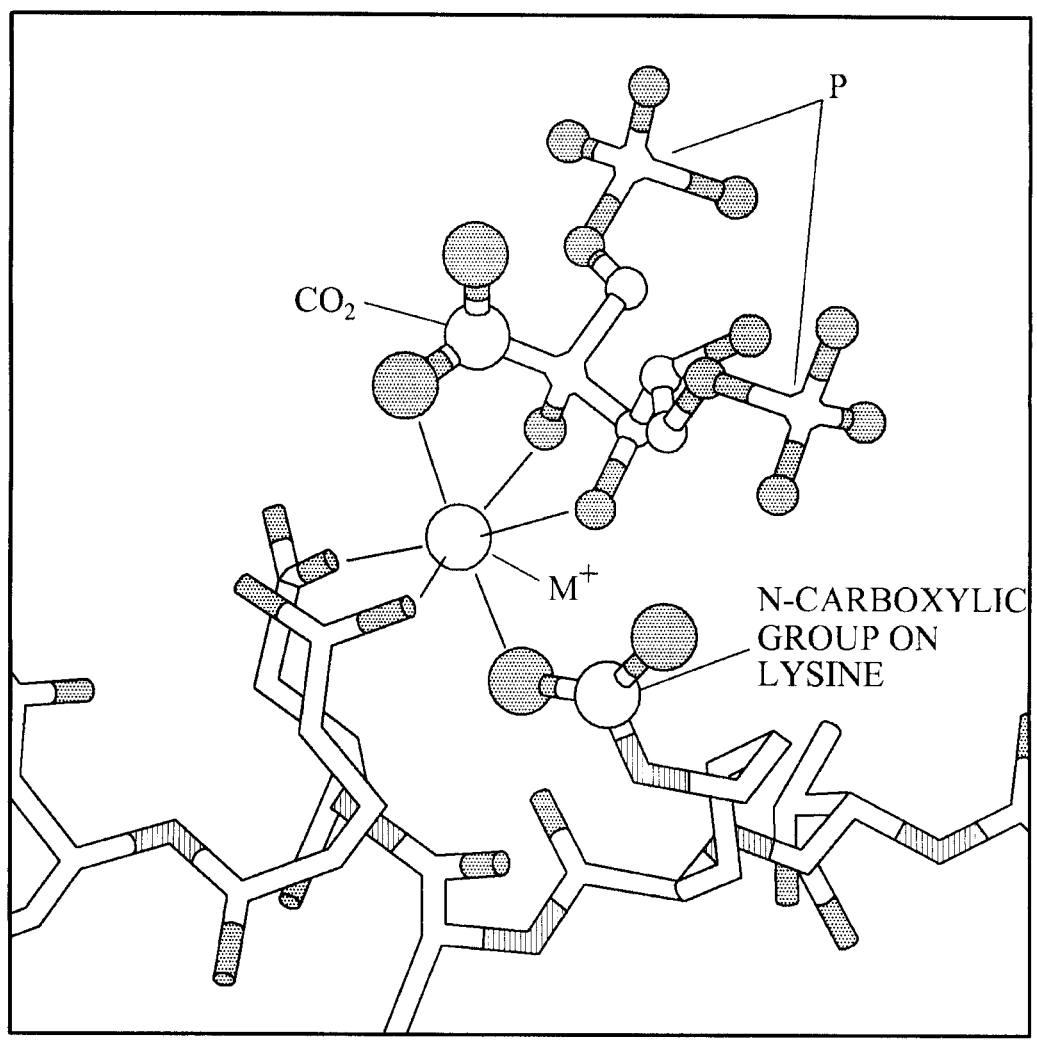
FIG. 1 illustrates an active site of RuBisCO.
Figure 2:
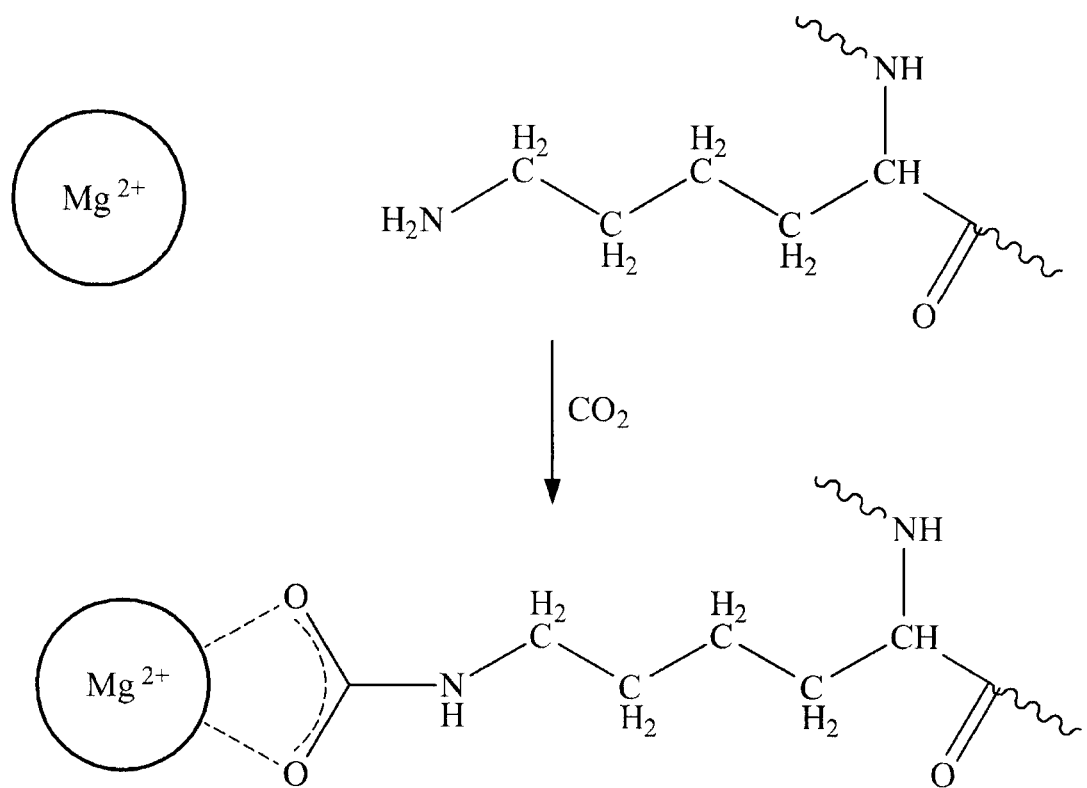
FIG. 2 illustrates coupling of a magnesium ion ($Mg^{2+}$), lysine and carbon dioxide in the active site of RuBisCO.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

It will be understood that when an element is referred to as being "connected to" another element, the element can be directly connected to another element or electrically connected to another element via intervening elements.

It will be understood that when an element is referred to as being "on" another element, the element can be directly on another element or intervening elements.

It will be further understood that when an element is referred to as "include" another element, the element can further include third elements, instead of excluding third elements, unless indicated otherwise.

Hereinafter, a compound, a carbon dioxide absorbent including the same, a method of preparing the carbon dioxide absorbent and a method of removing carbon dioxide according to the present invention will be described in detail with reference to exemplary embodiments and the accompanying drawings. However, it should be noted that the present invention is not limited by the exemplary embodiments and the drawings.

According to an aspect of the present invention, there is provided a compound including a divalent metal ion, an oxalate and an amine ligand.

The compound is represented by Formula 1 or Formula 2:

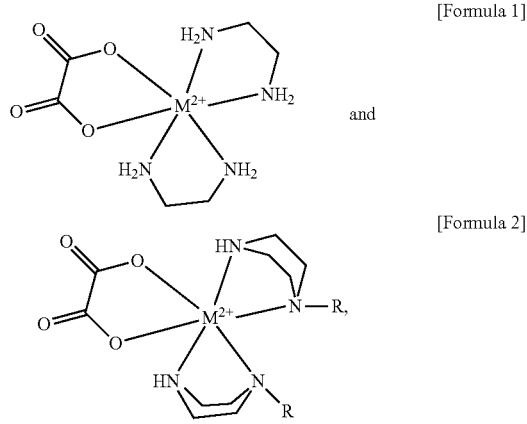

[Formula 1]

and

[Formula 2]

where $M^{2+}$ is the divalent metal ion and R is independently H or $CH_3$.

As shown in Formula 1, when a metal oxalate is coupled with an amine ligand, a similar active site to that of RuBisCO is formed. Such a structural feature enables absorption and separation of carbon dioxide only with partial pressure of a gas at normal temperature and pressure, as in RuBisCO. When diverse divalent metal oxalates and amine ligands are used, various physical properties, such as absorption speed and separation energy of carbon dioxide, may be adjusted. Accordingly, conditions of various carbon dioxide emission sources which need carbon dioxide absorbents with different characteristics may be satisfied with a single structure.

For example, when the divalent metal ion is magnesium, the compound may be represented by Formula 3:

[Formula 3]

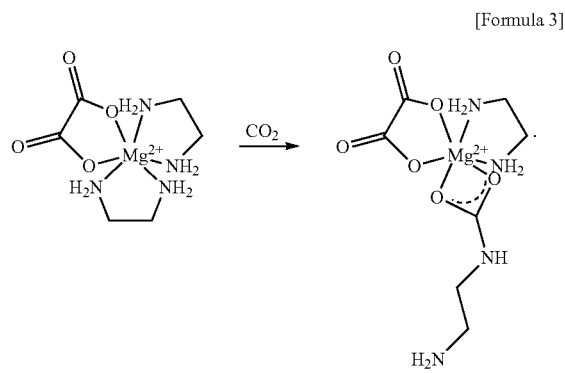

The divalent metal ion may include at least one selected from the group consisting of magnesium, calcium, nickel, zinc, strontium, barium, iron, copper, cobalt, lead and manganese, without being limited thereto.

The divalent metal ion may be present, in the compound, in an amount of 10% by weight (wt %) to 50 wt %, without being limited thereto. If the amount of the divalent metal ion is less than 10 wt % in the compound, the compound does not form a minimal structure to copy the active site of RuBisCO. If the amount of the divalent metal ion is greater than 50 wt %, the compound has a low carbon dioxide absorption ratio per unit weight.

The oxalate may be present, in the compound, in an amount of 45 wt % to 70 wt %, without being limited thereto. If the amount of the oxalate is less than 45 wt % in the compound, the compound does not form a minimal structure to copy the active site of RuBisCO. If the amount of the oxalate is greater than 70 wt %, the compound has a low carbon dioxide absorption ratio per unit weight.

The amine ligand may include at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, triethylenetetramine, N,N'-Bis(3-aminopropyl)ethylenediamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol 3-aminopropanol, 2-ethylaminoethanol, 2-methylaminoethanol and 2-diethylaminoethanol, without being limited thereto.

The amine ligand may be present, in the compound, in an amount of 35 wt % to 60 wt %, without being limited thereto. If the amount of the amine ligand ion is less than 35 wt % in the compound, carbon dioxide absorption at a low pressure may decrease or the ligand may be separated and lost during recycling. If the amount of the amine ligand ion is greater than 60 wt %, a high absorbent recycling temperature is needed.

According to another aspect of the present invention, there is provided a carbon dioxide absorbent including the compound and an organic solvent.

The organic solvent may include at least one selected from the group consisting of ethylene glycol, propylene glycol, butylene glycol, hexylene glycol, diethylene glycol, dipropylene glycol and triethylene glycol, without being limited thereto.

The carbon dioxide absorbent may further include an anticorrosive agent, a coagulant aid, an oxygen inhibitor, an antifoaming agent and mixtures thereof.

Figure 3:
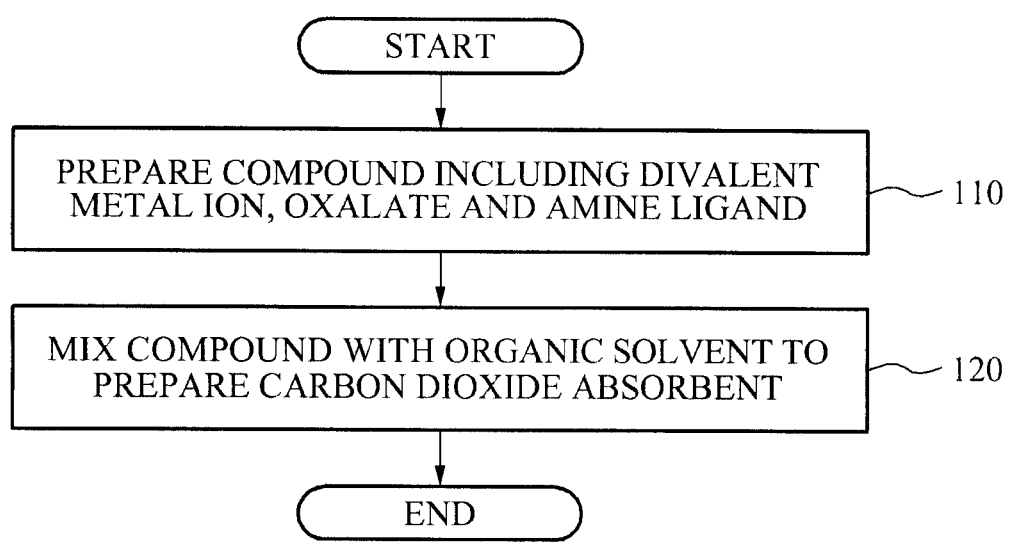
FIG. 3 is a flowchart illustrating a method of preparing a carbon dioxide absorbent according to an exemplary embodiment of the present invention.

FIG. 3 is a flowchart illustrating a method of preparing a carbon dioxide absorbent according to an exemplary embodiment of the present invention. Referring to FIG. 3, the method of preparing the carbon dioxide absorbent includes preparing a compound including a divalent metal ion, an oxalate and an amine ligand in operation 110, and mixing the compound with an organic solvent in operation 120.

First, the compound including the divalent metal ion, the oxalate and the amine ligand is prepared in operation 110.

The divalent metal ion may include at least one selected from the group consisting of magnesium, calcium, nickel, zinc, strontium, barium, iron, copper, cobalt, lead and manganese, without being limited thereto.

The divalent metal ion may be present in an amount of 10% by weight (wt %) to 50 wt % in the compound, without being limited thereto. If the amount of the divalent metal ion is less than 10 wt % in the compound, the compound does not form a minimal structure to copy the active site of RuBisCO. If the amount of the divalent metal ion is greater than 50 wt %, the compound has a low carbon dioxide absorption ratio per unit weight.

The oxalate may be present in an amount of 45 wt % to 70 wt % in the compound, without being limited thereto. If the amount of the oxalate is less than 45 wt % in the compound, the compound does not form a minimal structure to copy the active site of RuBisCO. If the amount of the oxalate is greater than 70 wt %, the compound has a low carbon dioxide absorption ratio per unit weight.

The amine ligand may include at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, triethylenetramine, N,N'-Bis(3-aminopropyl)ethylenediamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol 3-aminopropanol, 2-ethylaminoethanol, 2-methylaminoethanol and 2-diethylaminoethanol, without being limited thereto.

The amine ligand may be present in an amount of 35 wt % to 60 wt % in the compound, without being limited thereto. If the amount of the amine ligand ion is less than 35 wt % in the compound, carbon dioxide absorption at a low pressure may decrease. If the amount of the amine ligand ion is greater than 60 wt %, a high absorbent recycling temperature is needed.

Subsequently, the compound is mixed with the organic solvent to prepare the carbon dioxide absorbent in operation 120.

The organic solvent may include at least one selected from the group consisting of ethylene glycol, propylene glycol, butylene glycol, hexylene glycol, diethylene glycol, dipropylene glycol and triethylene glycol, without being limited thereto.

The organic solvent is present in an amount of 10 wt % to 90 wt %, preferably 50 wt % to 80 wt % in the compound, without being limited thereto.

Figure 4:
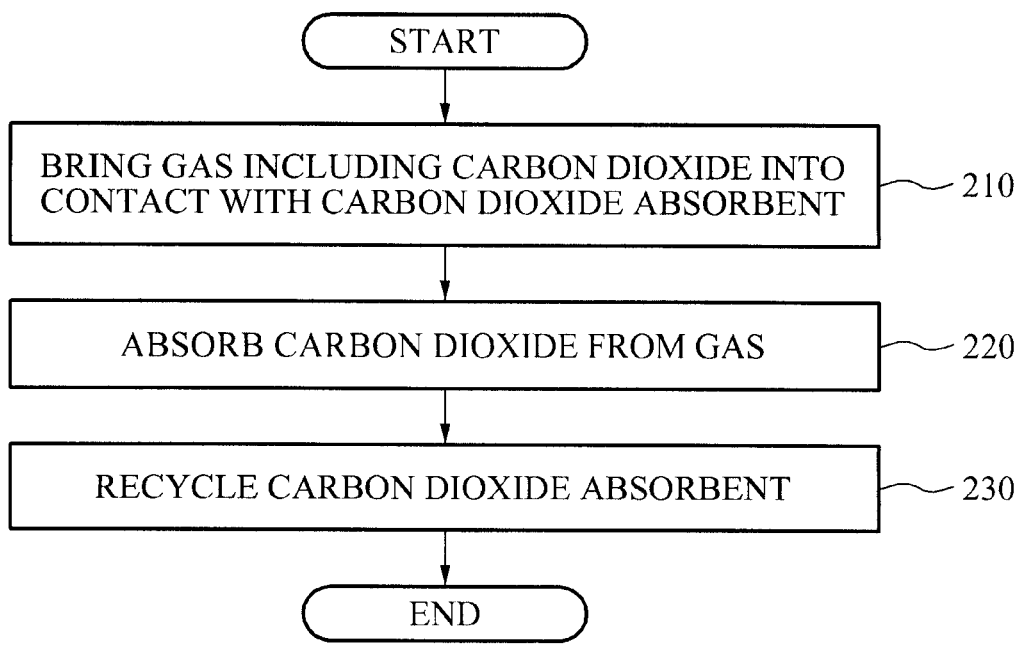
FIG. 4 is a flowchart illustrating a method of removing carbon dioxide according to an exemplary embodiment of the present invention.

FIG. 4 is a flowchart illustrating a method of removing carbon dioxide according to an exemplary embodiment of the present invention. Referring to FIG. 4, the method of removing carbon dioxide includes bringing a gas including carbon dioxide into contact with a carbon dioxide absorbent including a compound including a divalent metal ion, an oxalate and an amine ligand, and an organic solvent in operation 210, absorbing carbon dioxide from the gas in operation 220, and recycling the carbon dioxide absorbent in operation 230.

First, the gas including carbon dioxide is brought into contact with the carbon dioxide absorbent including the compound the divalent metal ion, the oxalate and the amine ligand and the organic solvent in operation 210.

The divalent metal ion may include at least one selected from the group consisting of magnesium, calcium, nickel, zinc, strontium, barium, iron, copper, cobalt, lead and manganese, without being limited thereto.

The amine ligand may include at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, triethylenetramine, N,N'-Bis(3-aminopropyl)ethylenediamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol 3-aminopropanol, 2-ethylaminoethanol, 2-methylaminoethanol and 2-diethylaminoethanol, without being limited thereto.

The organic solvent may include at least one selected from the group consisting of ethylene glycol, propylene glycol, butylene glycol, hexylene glycol, diethylene glycol, dipropylene glycol and triethylene glycol, without being limited thereto.

Subsequently, carbon dioxide is absorbed from the gas in operation 220.

Generally, an increasing amount of carbon dioxide is absorbed with a lower temperature and a higher pressure. However, since process costs rise excessively to reduce efficiency of the absorbing process out of such temperature and pressure ranges, the absorbing may be carried out within the ranges.

The absorbing of carbon dioxide may be carried out at a pressure in a range of atmospheric pressure to 10 atmospheres (atm) and at a temperature in a range of room temperature to 70° C., without being limited thereto. The pressure may be in a range of 1 atm to 2 atm, or 2 atm to 10 atm. The temperature may be in a range of room temperature to 70° C., or 40° C. to 70° C.

Next, the carbon dioxide absorbent is recycled in operation 230.

The recycling of the carbon dioxide absorbent may be carried out at a pressure in a range of atmospheric pressure to 5 atm and at a temperature in a range of 80° C. to 150° C., without being limited thereto. The pressure may be in a range of 0.01 atm to 2 atm, or from 0.1 atm to 5 atm. The temperature may be in a range of 105° C. to 120° C., or 90° C. to 120° C.

A compound, a carbon dioxide absorbent including the same, a method of preparing the carbon dioxide absorbent and a method of removing carbon dioxide according to exemplary embodiments may overcome issues of high recycling energy and low absorptivity of a conventional carbon dioxide absorbent to considerably reduce recycling energy and absorb a greater amount of carbon dioxide per unit absorbent, so that a size of a carbon dioxide absorption tower may be reduced and a less amount of recycling energy may be used, contributing to a substantial decrease in device manufacture costs and management costs.

Hereinafter, the present invention will be explained in more detail with reference to illustrative examples. These examples are provided for illustrative purposes only and are not to be in any way construed as limiting the present invention.

EXAMPLE 1

Carbon Dioxide Absorptivity of Carbon Dioxide Absorbent

A composition of 15% of $CO_2$, 5% of $O_2$ and a remaining balance of $N_2$, similar to a composition of waste gas from a coal-fired thermal power plant, was reacted at 40° C. and normal pressure in a continuous stirred tank reactor. A conventional carbon dioxide absorbent uses 70 wt % of water as an absorbent mixture, while a carbon dioxide absorbent according to the present invention uses 70 wt % of ethylene glycol. It is verified that ethylene glycol hardly absorbs carbon dioxide.

Figure 5:
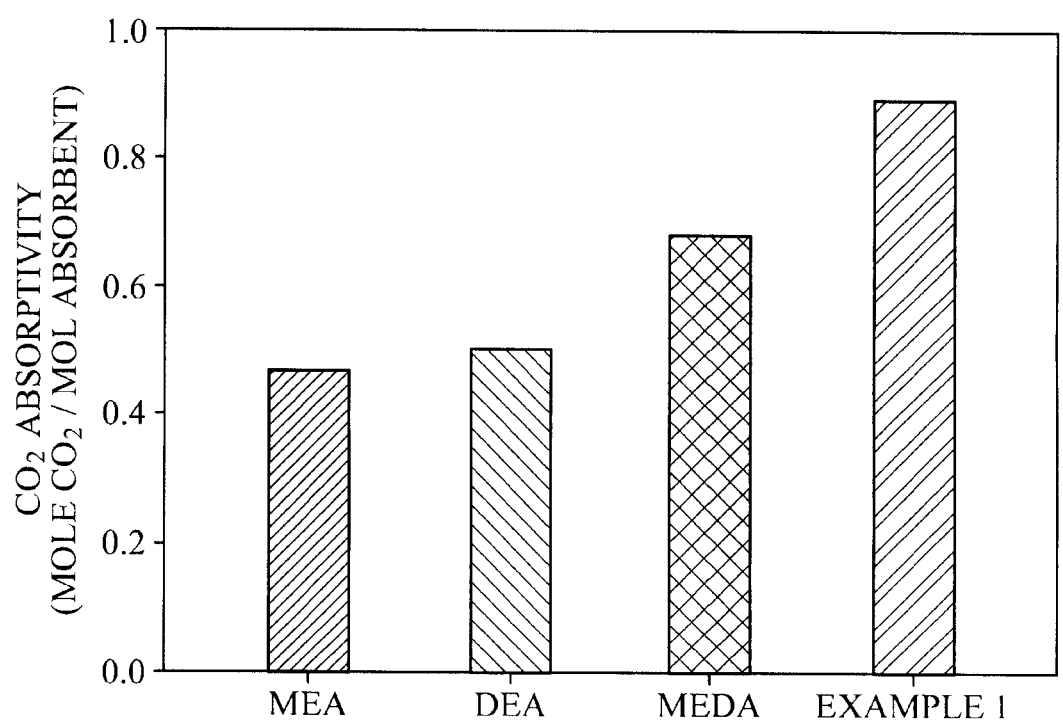
FIG. 5 is a graph comparing absorptivity of a conventional carbon dioxide absorbent with that of a carbon dioxide absorbent according to an exemplary embodiment.

FIG. 5 is a graph comparing absorptivity of the conventional carbon dioxide absorbent with that of the carbon dioxide absorbent according to the exemplary embodiment of the present invention. In terms of carbon dioxide absorptivity (mol $CO_2$/mol absorbent), MEA is 0.47, DEA is 0.51, MDEA is 0.68 and the carbon dioxide absorbent according to the present invention is 0.89, showing that the carbon dioxide absorbent according to the present invention exhibits a higher absorptivity than the conventional carbon dioxide absorbent. When carbon dioxide absorptivity is high, a small absorption tower may be used, thereby reducing device costs.

EXAMPLE 2

Comparison of Recycling Energy of Carbon Dioxide Absorbent

Recycling energy of a carbon dioxide absorbent is expressed as a sum of heat of reaction between the absorbent and carbon dioxide, sensible heat due to a temperature difference between an absorption tower and a recycling tower, and latent heat of vaporization of water included in the absorbent. The sensible heat is 80° C. as the absorption tower is 40° C. and the recycling tower is 120° C. in most absorbing-recycling processes, and the latent heat is latent heat of vaporization of 70 wt % of water included in the absorbent.

The carbon dioxide absorbent according to the present invention uses ethylene glycol, instead of water used for the conventional absorbent, and ethylene glycol has a boiling point of 197.7° C. and does not have energy consumed for the latent heat of vaporization. The carbon dioxide absorbent and carbon dioxide absorbing energy are analyzed using a differential reaction calorimeter (DRC). Regarding carbon dioxide absorbing energy (kJ/mol $CO_2$) of each absorbent, MEA is 82.38, DEA is 70.42, MDEA 59.8 and the carbon dioxide absorbent is 57.65.

Regarding recycling energy based on the foregoing results and the continuous absorbing-recycling reactors, MEA is 3.8 to 4.0 GJ/t-$CO_2$. The carbon dioxide absorbent according to the present invention exhibits a recycling energy of 1.99 GJ/t-$CO_2$, which is about ½ of the MEA recycling energy. In the conventional carbon dioxide absorbents using water, carbon dioxide absorbed during the recycling process is separated from the absorbents, transported to an upper part of the tower by vaporized water, and discharged out of the recycling tower. However, the carbon dioxide absorbent according to the present invention uses ethylene glycol and thus does not need an independent separation process. The present invention employs a method of recycling part of separated carbon dioxide to the absorption tower, in which case an energy of about 0.35 GJ/t-$CO_2$ is additionally consumed. Thus, the carbon dioxide absorbent according to the present invention has a recycling energy of 2.35 GJ/t-$CO_2$, which is about 60% of the MEA recycling energy. Accordingly, recycling energy involved in largest amount in capturing and storing carbon dioxide may be reduced, thereby considerably decreasing operation costs of currently 50 to 100 US dollars to remove 1 ton of carbon dioxide.

Applying the carbon dioxide absorbent according to the present invention to a carbon dioxide absorbent process for separating carbon dioxide among combustion exhaust gases at low cost from now on contributes substantially to secure technology of reducing greenhouse gases against global warming. Although the carbon dioxide absorbent according to the present invention is prepared based on concentration of carbon dioxide included in waste gas from a coal-fired thermal power plant, it may be also prepared according to a wide range of carbon dioxide concentration. Thus, the carbon dioxide absorbent may be not only used for sources of emitting a large amount of carbon dioxide, such as a petrochemical process, a cement process and a steel manufacture process but available for home, offices and traffic equipment.

As described above, a compound, a carbon dioxide absorbent including the same, a method of preparing the carbon dioxide absorbent and a method of removing carbon dioxide according to exemplary embodiments may overcome issues of high recycling energy and low absorptivity of a conventional carbon dioxide absorbent to considerably reduce recycling energy and absorb a greater amount of carbon dioxide per unit absorbent, so that a size of a carbon dioxide absorption tower may be reduced and a less amount of recycling energy may be used, contributing to a substantial decrease in device manufacture costs and management costs.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A compound comprising:
   a divalent metal ion;
   an oxalate; and
   an amine ligand;
   wherein the divalent metal ion comprises magnesium, and
   wherein the amine ligand comprises at least one selected from the group consisting of monoethanolamine (MEA), diethanolamine (DEA), triethanolamine, methylmonoethanolamine, methyldiethanolamine, dimethylmonoethanolamine, diethylmonoethanolamine, monoisopropanolamine, diisopropanolamine, piperazine, 1-methylpiperazine, 2-methylpiperazine, dimethylpiperazine, 1-ethylpiperazine, 1-(2-aminoethyl)piperazine, 1-(2-hydroxyethyl)piperazine, 2-piperidinemethanol, 2-piperidineethanol, 2-amino-2-methyl-1-propanol, 2-amino-2-methyl-butanol, 2-amino-2-ethyl-1-propanediol, 3-aminopropanol, 2-ethylaminoethanol, 2-methylaminoethanol and 2-diethylaminoethanol.

2. The compound of claim 1, wherein the divalent metal ion is present, in the compound, in an amount of 10% by weight (wt %) to 50 wt %.

3. The compound of claim 1, wherein the oxalate is present, in the compound, in an amount of 45 wt % to 70 wt %.

4. The compound of claim 1, wherein the amine ligand is present, in the compound, in an amount of 35 wt % to 60 wt %.

5. A carbon dioxide absorbent comprising:
   the compound of any one of claim 1, 2, 3 or 4; and
   an organic solvent.

6. The carbon dioxide absorbent of claim 5, wherein the organic solvent comprises at least one selected from the group consisting of ethylene glycol, propylene glycol, butylene glycol, hexylene glycol, diethylene glycol, dipropylene glycol and triethylene glycol.

7. A method of preparing a carbon dioxide absorbent, the method comprising:
   preparing the compound of claim 1; and
   mixing the compound and an organic solvent.

8. A method of removing carbon dioxide, the method comprising:

bringing a gas comprising carbon dioxide into contact with the carbon dioxide absorbent of any one of claim 1, 2, 3 or 4;
absorbing carbon dioxide from the gas; and
recycling the carbon dioxide absorbent.

9. The method of claim 8, wherein the absorbing of the carbon dioxide is carried out at a pressure in a range of atmospheric pressure to 10 atmospheres (atm), and at a temperature in a range of room temperature to 70° C.

10. The method of claim 8, wherein the recycling of the carbon dioxide absorbent is carried out at a pressure in a range of atmospheric pressure to 5 atm, and at a temperature in a range of 80° C. to 150° C.

11. The carbon dioxide absorbent of claim 5, wherein the organic solvent comprises ethylene glycol.

* * * * *